United States Patent

[11] 3,573,693

| [72] | Inventor | Joacob Chass |
| | | Forest Hills, N.Y. |
| [21] | Appl. No. | 804,918 |
| [22] | Filed | Mar. 6, 1969 |
| [45] | Patented | Apr. 6, 1971 |
| [73] | Assignee | Pickering & Company, Inc. |
| | | Plainview, N.Y. |

[54] MULTINULL ROTARY VARIABLE DIFFERENTIAL TRANSFORMER
5 Claims, 10 Drawing Figs.

[52] U.S. Cl. ..................................................... 336/135
[51] Int. Cl. ..................................................... H01f 21/06
[50] Field of Search............................................ 336/119, 120, 132, 133, 134, 135

[56] References Cited
UNITED STATES PATENTS

| 2,756,357 | 7/1956 | Schaberg ..................... | 336/135X |
| 3,045,196 | 7/1962 | Packard ....................... | 336/135 |
| 3,085,192 | 4/1963 | Maier........................... | 336/135X |
| 3,128,044 | 4/1964 | Packard ....................... | 336/135 |
| 3,225,229 | 12/1965 | Packard ...................... | 336/135X |
| 3,394,363 | 7/1968 | Norman ....................... | 336/135X |

Primary Examiner—Thomas J. Kozma
Attorney—Kane, Dalsimer, Kane, Sullivan and Kurucz ABSTRACT: A rotary variable differential transformer having a plurality of null positions within 360° of mechanical rotation having each of two primary windings associated with a toothed magnetic ring, with the rings identical but angularly displaced and the primary windings wound in series opposition, and a secondary winding associated with a toothed rotor being rotatable with respect to the toothed rings whereby the angular position of the rotor determines the voltage in the secondary winding from null to peak output.

Patented April 6, 1971

INVENTOR
JACOB CHASS
BY
Kane, Dalsimer, Kane, Sullivan and Smith
ATTORNEYS

Patented April 6, 1971 3,573,693

INVENTOR
JACOB CHASS
BY
ATTORNEYS

Patented April 6, 1971

INVENTOR
JACOB CHASS
BY
ATTORNEYS

MULTINULL ROTARY VARIABLE DIFFERENTIAL TRANSFORMER

BACKGROUND OF THE INVENTION

Differential transformers of the type composed of primary and secondary coils and a movable member, the position of which determines the secondary voltage for given primary voltage are well known. In transformers of this type, secondary windings as well as primary windings are frequently connected in series opposition relationship as well as in series aiding relationship. By series opposition relationship it is meant that the coils are connected so that the voltages are in opposite phase. By series aiding relationship it is meant that the voltages in the coils are of the same phase. When there is a minimum or substantially zero output it is said that the null position has been achieved.

There is a class of such variable differential transformers which are referred to as linear transformers since the output voltage is a linear function of the displacement of a member such as an armature core from the null position.

When the output is related to the angular position of a member such as a rotor, the device is referred to as a rotary variable differential transformer.

There are many types of rotary variable differential transformers having great utility. However, there has been a need for a small relatively high power output rotary variable differential transformer having a plurality of null positions within a 360° mechanical rotation of the rotor.

SUMMARY OF THE INVENTION

A multinull rotary variable differential transformer comprising a magnetic casing, first, second and third coils wound on the casing and insulated therefrom, the coils being longitudinally displaced with the third coil between the first and second coils, the first and second coils providing a first winding, the third coil providing a second winding, first and second rings of magnetic teeth supported by the casing respectively within the magnetic field of the first and second coils, the first magnetic teeth being angularly displaced from the second magnetic teeth, a rotor member rotatably supported by the casing and a third ring of magnetic teeth provided on the rotor member within the magnetic field of the third coil, and means for energizing one of the windings whereby the remaining of the windings is energized in accordance with the relative position of the rotor with respect to the rings.

DESCRIPTION OF THE PREFERRED EMBODIMENT

Figure 1:
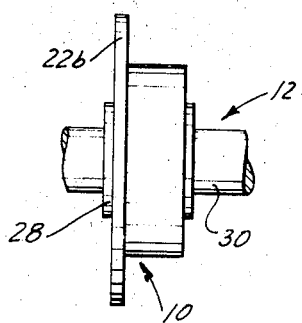
FIG. 1 is a side view of a multinull rotary variable differential transformer constructed in accordance with the teachings of this invention.
Figure 2:
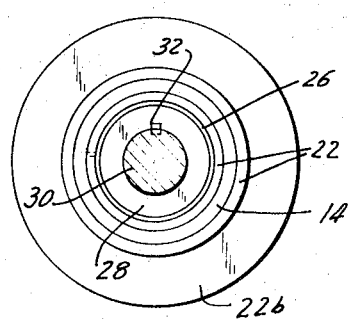
FIG. 2 is an end view of the transformer shown in FIG. 1 as viewed from the right in FIG. 1.
Figure 3:
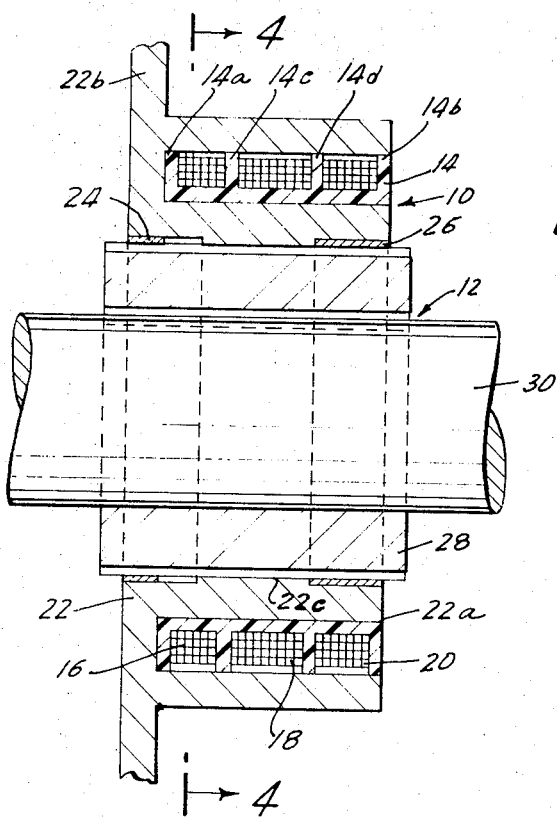
FIG. 3 is a partially sectional longitudinal view of the transformer with the stator and rotor teeth shown partially in section and partially diagrammatically.

The multinull rotary variable differential transformer which is the subject of this invention consists essentially of a stator and rotor assembly designated generally in the FIGS. by the numerals 10 and 12 respectively.

The stator includes a tubular transformer bobbin 14 formed of a nonmagnetic, nonconductive material such as a plastic or ceramic. The bobbin 14 has a pair of radially extending end flanges 14a and 14b and a pair of radially extending additional flanges 14c and 14d spaced along the bobbin between the end flanges. In the subject embodiment the flanges are all of equal diameter and form three compartments.

The bobbin is provided with three coils 16, 18 and 20. Coil 16 which is a helically wound coil of insulated electrically conductive wire is wound around the bobbin 14 within the compartment defined by flanges 14a and 14c and is of uniform turn density throughout its length. Coil 20 is identical to coil 16, having the same number of turns, and is wound around the bobbin between the flanges 14d and 14b. The remaining coil 18 is wound around the bobbin between the flanges 14c and 14d and can be a different number of turns than either of the coils 16 or 20. However, it also is helically wound and is insulated electrically conductive wire.

Figure 9:
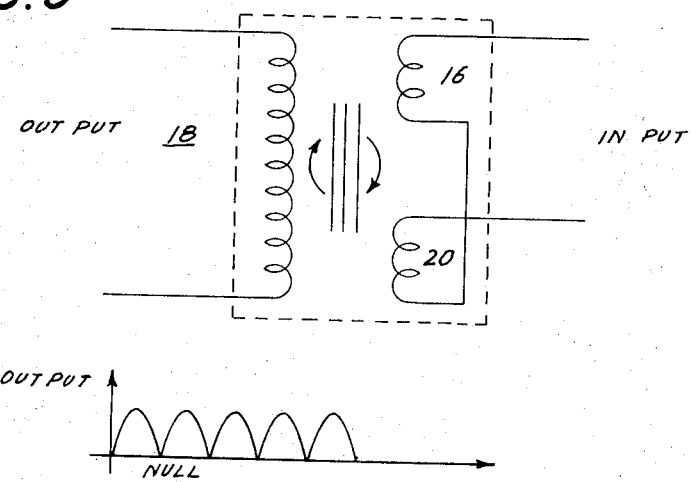
FIG. 9 is a schematic view of the coil windings and connection.

As seen in FIG. 9, coils 16 and 20 are connected together in series opposition providing the primary of a transformer of which coil 18 is the secondary.

The bobbin 14 is supported within a slot 22a formed in cylindrical casing 22. The casing 22 is of ferromagnetic material and as shown in the FIGS. is cylindrical with a mounting flange 22b at one end thereof. A substantially cylindrical bore 22c is formed in the casing supports at either end a ring of ferromagnetic material having longitudinally inwardly projecting teeth providing zones of magnetic material separated by air gaps. Hence the ring 24 is within the magnetic field of primary coil 16 and the ring 26 is within the magnetic field of the primary coil 20. The teeth on ring 24 are designated by the numeral 24a while the spacers or gaps between teeth are designated by the numeral 24b and the teeth and gaps of ring 26 are respectively designated by the numerals 26a and 26b.

Figure 7:
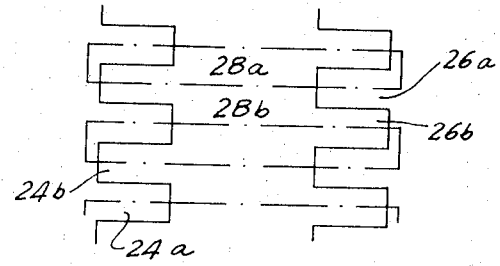
FIG. 7 is a diagrammatic spread view of the teeth orientation of FIG. 5.
Figure 8:
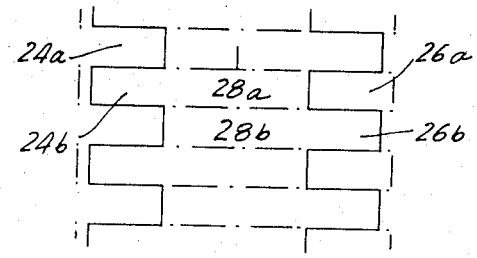
FIG. 8 is diagrammatic spread view similar to the view of FIG. 7 but of the teeth orientation of FIG. 6.

In this embodiment the rings are identical, each having 24 teeth of uniform dimension and the separating air gaps are equal in width to the teeth. The rings however are angularly displaced a distance equal to the width of one tooth. The orientation of the teeth is such that if a line is drawn in the axial direction a gap in one end or in the position of one ring corresponds to the magnetic material or tooth part in the remaining ring. The views in FIGS. 7 and 8 illustrate this.

The rotor 12 consists of a rotor member 28 rotatably supported within the bore 22c by shaft 30 to which it is keyed at 32.

Figure 4:
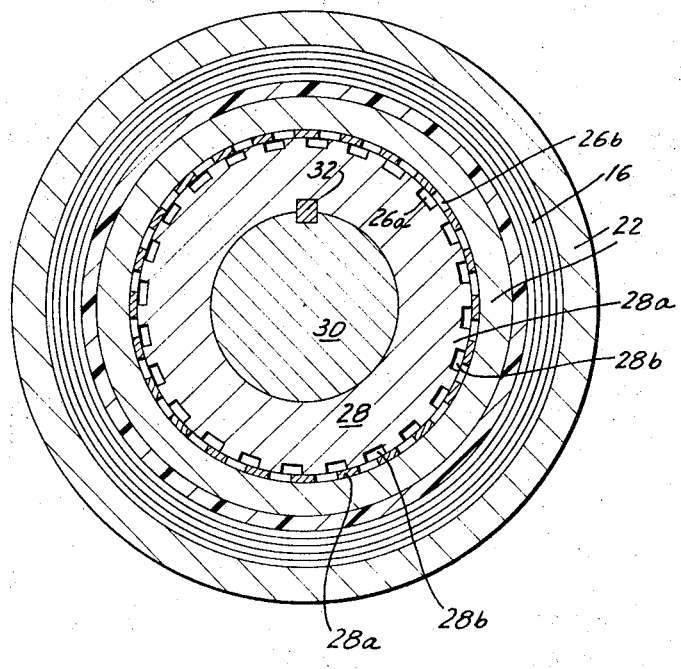
FIG. 4 is a transverse sectional view taken along the line 4—4 in the direction of the arrows in FIG. 3.
Figure 5:
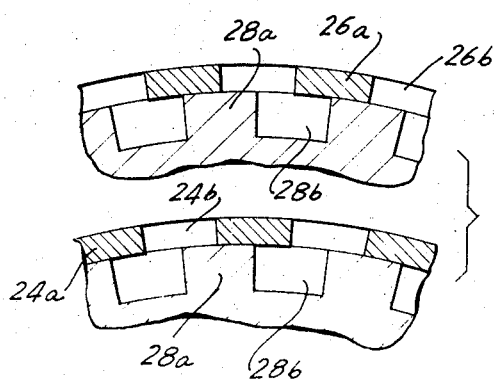
FIG. 5 is a segmentary view illustrating the disposition of rotor teeth with respect to stator teeth in one position of the rotor in the transformer.
Figure 6:
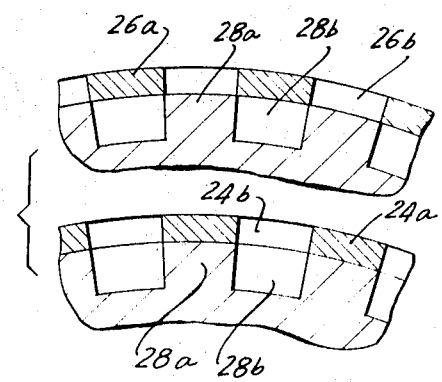
FIG. 6 is a segmentary view similar to the view shown in FIG. 5 with the rotor displaced angularly a distance of one-half tooth.

The rotor member 28 is also formed of ferromagnetic material and as seen in FIG. 4, has a plurality of projecting tooth members providing a cross section similar to a gear. The teeth of member 28 are designated in the FIGS. by the numeral 28a and the gaps between teeth by the numerals 28b. The teeth are equal in dimension and the air gaps between teeth have a width equal to the width of the teeth. In this embodiment there are 24 teeth provided on the rotor member 28 which is the same member as the teeth on the magnetic rings 24 and 26 and the width of each tooth 28a is equal to the width of each tooth 24a and 26a and the air gaps 28b have widths equal to the air gaps 24b and 26b.

The rotor assembly is suitably supported within the bore 22c and rotatable with respect to the casing 22. Any means of supporting the rotor might be utilized, such as using a portion of the casing as a sleeve bearing or providing bearings for the shaft. Also a suitable thrust relieving device, such as a thrust bearing, can be utilized. Such techniques are well known in the art.

Figure 10:
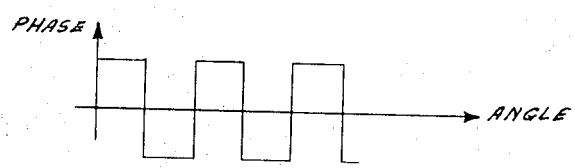
FIG. 10 is a diagrammatic showing of the output characteristics of the transformer.

The output at secondary coil 18 is determined by the angular position of the shaft 30. In use the coils 16 and 20 are energized and the output taken across the coil 18. Referring to FIGS. 5, 6, 7 and 8, it is seen that in the relative position of rotor and stator of FIGS. 5 and 7 the area covered by the teeth of the rotor is equal or the same at the teeth of rings 24 and 26. In such a position the magnetic fluxes due to each primary coil will be equal to each other and since they are in opposition the voltages induced in the secondary coil will cancel each other out. This will be the null position as indicated in FIG. 10. When the rotor is rotated one-half tooth width to the relative position of rotor and stator shown in FIGS. 6 and 8 the magnetic part or teeth of ring 24 will be overlapped by the rotor teeth while the remaining ring 26 will have the air gaps in line with the rotor teeth. In such a situation as that illustrated in FIGS. 6 and 8 the flux due to the overlapped end will be very high and the flux due to the exposed end will be low and this will be a position of maximum output. This is illustrated in FIG. 10. As illustrated in FIG. 10 however, there will be a phase reversal of the output voltage at each instant where the output of the unit passes through null. In the present embodiment in which the end rings and the rotor are provided with 24 teeth there will be 48 null positions within a 360° mechanical rotation of the shaft 30. The number of null positions within a mechanical rotation of 360° of course can be altered while keeping within the concept of this invention.

I claim:

1. A rotary variable differential transformer including in combination a magnetic casing, first, second and third coils wound on a bobbin of nonconducting, nonmagnetic material within said casing and insulated therefrom, said coils being longitudinally displaced with said third coil between said first and second coils, said first and second coils providing a first winding, said third coil providing a second winding, first and second rings of magnetic teeth supported by said casing respectively within the magnetic fields of said first and second coils, said first magnetic teeth being angularly displaced from said second magnetic teeth, a rotor member rotatably supported by said casing, a third ring of magnetic teeth provided on said rotor within the magnetic field of said third coil, and means for energizing one of said windings whereby the remainder of said windings is energized in accordance with the relative position of said third teeth and said first and second teeth.

2. A rotary variable differential transformer in accordance with claim 1 in which said first and second coils are connected in series opposition.

3. A rotary variable differential transformer in accordance with claim 1 in which a bore is formed in said casing, said first and second rings of magnetic teeth are supported within said bore and said third ring of magnetic teeth is rotatably supported within said bore with said first and second rings disposed at either end of said bore radially inwardly of said first and second coils respectively.

4. A rotary variable differential transformer in accordance with claim 3 in which there are equal numbers of said first and second magnetic teeth of identical dimension but angularly displaced one tooth width.

5. A rotary variable differential transformer in accordance with claim 4 in which said third ring of magnetic teeth includes teeth equal in number to the teeth on one of said first and second rings and each of said third teeth has the same width as each of said first and second teeth with the gaps between teeth equal to the width of a tooth.